United States Patent
Miwa (10) Patent No.: US 11,410,804 B2
(45) Date of Patent: Aug. 9, 2022

(54) R-T-B BASED PERMANENT MAGNET (71) Applicant: TDK Corporation, Tokyo (JP)

(72) Inventor: Masashi Miwa, Tokyo (JP)

(73) Assignee: TDK Corporation, Tokyo (JP)

( * ) Notice: Subject to any disclaimer, the term of this patent is extended or adjusted under 35 U.S.C. 154(b) by 95 days.

(21) Appl. No.: 16/819,071

(22) Filed: Mar. 14, 2020

(65) Prior Publication Data

US 2020/0303102 A1 Sep. 24, 2020

(30) Foreign Application Priority Data

Mar. 19, 2019 (JP) .............................. JP2019-051539

(51) Int. Cl.
*H01F 1/057* (2006.01)
*H01F 41/02* (2006.01)
*H01F 7/02* (2006.01)
*C22C 38/00* (2006.01)

(52) U.S. Cl.
CPC ......... *H01F 1/0577* (2013.01); *C22C 38/005* (2013.01); *H01F 7/02* (2013.01); *H01F 41/0293* (2013.01)

(58) Field of Classification Search
None
See application file for complete search history.

(56) References Cited

U.S. PATENT DOCUMENTS

| 2005/0067058 A1* | 3/2005 | Fujimori | ............... C22C 38/005 148/302 |
| 2013/0092868 A1* | 4/2013 | Nakajima | ............. C22C 38/005 252/62.51 R |
| 2014/0314612 A1* | 10/2014 | Nakajima | ........... H01F 41/0293 419/38 |
| 2015/0155083 A1 | 6/2015 | Miwa et al. | |

FOREIGN PATENT DOCUMENTS

WO WO-2013/122256 A1 8/2013

* cited by examiner

Primary Examiner — Xiaowei Su
(74) Attorney, Agent, or Firm — Faegre Drinker Biddle & Reath LLP (57) ABSTRACT

A permanent magnet 2 includes Nd, Fe, and B, the permanent magnet 2 contains a plurality of main phase grains; and grain boundaries positioned between the main phase grains, the main phase grains include Nd, Fe, and B, at least a portion of the grain boundaries contains an R'—O—C phase, the R'—O—C phase includes a rare earth element R', O, and C, the concentration of each of R', O, and C in the R'—O—C phase is higher compared to the main phase grains, the permanent magnet 2 comprises a surface layer portion 21 and a central portion 22, the surface layer portion 21 is positioned on the surface side of the permanent magnet 2, the central portion 22 is positioned on the inner side of the permanent magnet 2, the proportion of the area of the R'—O—C phase occupying in a cross-section of the surface layer portion 21 is S1 %, the proportion of the area of the R'—O—C phase occupying in a cross-section of the central portion 22 is S2%, and S1 is higher than S2.

6 Claims, 3 Drawing Sheets

R-T-B BASED PERMANENT MAGNET

TECHNICAL FIELD

The present invention relates to an R-T-B based permanent magnet including at least a rare earth element R, a transition metal element T, and boron B.

BACKGROUND

R-T-B based permanent magnets have excellent magnetic characteristics. However, because rare earth elements, which constitute a main component of the R-T-B based permanent magnets, are easily oxidized, the R-T-B based permanent magnets tend to be susceptible to corrosion.

International Publication No. 2013/122256 discloses that when a magnet body contains an R—O—C concentrated part, corrosion resistance of the magnet body itself is enhanced. An R—O—C concentrated part is a grain boundary phase in which the concentration of each of rare earth element R, O, and C is higher compared to the main phase grains.

SUMMARY

In order for the R-T-B based permanent magnet described in International Publication No. 2013/122256 to have excellent corrosion resistance, it is necessary to form a certain amount of an R—O—C concentrated part over the entire magnet. However, since there is a tendency that an R-rich phase in the grain boundaries decreases in association with the formation of the R—O—C concentrated part, the coercivity of the R-T-B based permanent magnet is prone to decrease.

It is an object of the present invention to provide an R-T-B based permanent magnet having excellent corrosion resistance and high coercivity.

An R-T-B based permanent magnet according to an aspect of the present invention is an R-T-B based permanent magnet including a rare earth element R, a transition metal element T, and B. The R-T-B based permanent magnet includes at least Nd as R, the R-T-B based permanent magnet includes at least Fe as T, the R-T-B based permanent magnet contains a plurality of main phase grains; and grain boundaries positioned between the main phase grains, the main phase grains include Nd, T, and B, at least a portion of the grain boundaries contains an R'—O—C phase, the R'—O—C phase includes a rare earth element R', O, and C, R' is at least one selected from the group consisting of Nd, Pr, Tb, and Dy, the unit of the concentration of each of R', O, and C is atom %, the concentration of each of R', O, and C in the R'—O—C phase is higher compared to the main phase grains, the R-T-B based permanent magnet comprises a surface layer portion and a central portion, the surface layer portion is positioned on the surface side of the R-T-B based permanent magnet, the central portion is positioned on the inner side of the R-T-B based permanent magnet, the proportion of the area of the R'—O—C phase occupying in a cross-section of the surface layer portion is S1%, the proportion of the area of the R'—O—C phase occupying in a cross-section of the central portion is S2%, and S1 is higher than S2.

S1−S2 may be from 1.0 to 80.

S1 may be from 4.3 to 80.

At least a portion of the R'—O—C phase may further include N.

According to the present invention, an R-T-B based permanent magnet having excellent corrosion resistance and high coercivity can be provided.

DETAILED DESCRIPTION

Hereinafter, suitable embodiments of the present invention will be described with reference to the drawings. In the drawings, equivalent constituent elements will be assigned with equivalent reference numerals. The present invention is not intended to be limited to the following embodiments. The term "permanent magnet" described below means an "R-T-B based permanent magnet" in all cases. The unit for the "concentration" of various elements in the permanent magnet is atom %.

(Permanent Magnet)

The permanent magnet according to the present embodiment includes at least a rare earth element (R), a transition metal element (T), and boron (B).

The permanent magnet includes at least neodymium (Nd) as the rare earth element R. The permanent magnet may further include another rare earth element R in addition to Nd. The other rare earth element R may be at least one selected from the group consisting of scandium (Sc), yttrium (Y), lanthanum (La), cerium (Ce), praseodymium (Pr), samarium (Sm), europium (Eu), gadolinium (Gd), terbium (Tb), dysprosium (Dy), holmium (Ho), erbium (Er), thulium (Tm), ytterbium (Yb), and lutetium (Lu).

The permanent magnet includes at least iron (Fe) as the transition metal element T. The permanent magnet may include Fe only as the transition metal element T. The permanent magnet may include both Fe and cobalt (Co) as the transition metal element T.

Figure 1A:
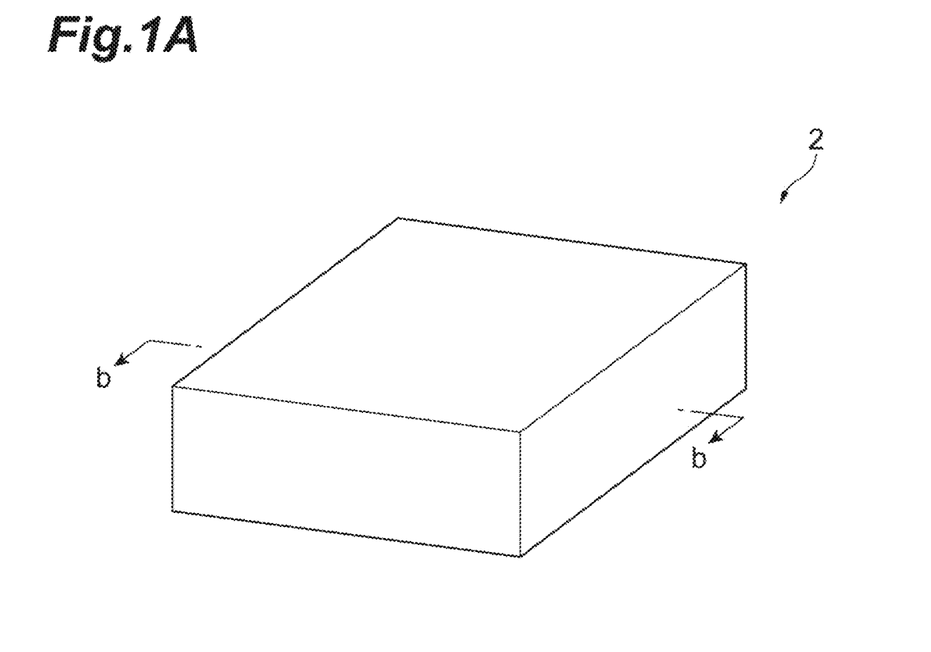
FIG. 1A is a perspective view of an R-T-B based permanent magnet according to an embodiment of the present invention.
Figure 1B:
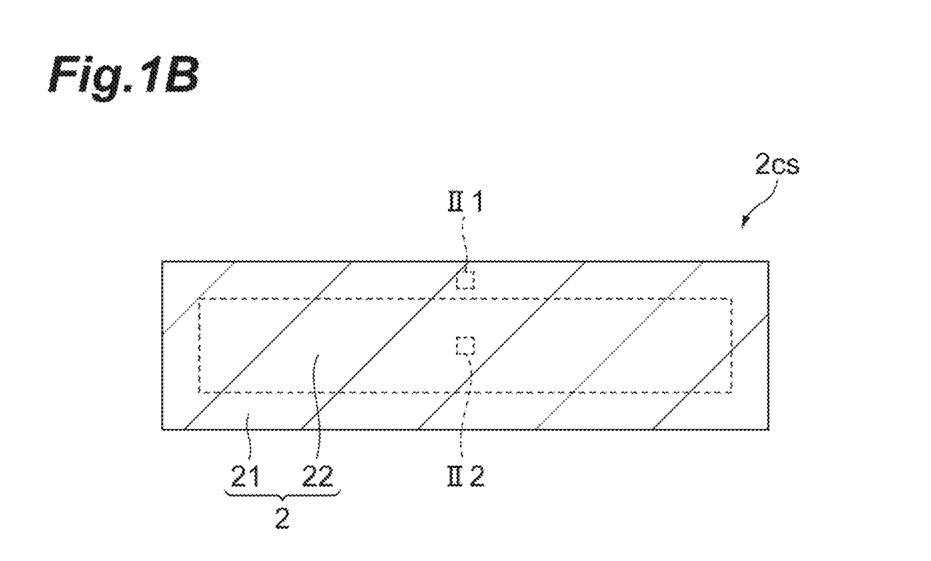
FIG. 1B is a cross-sectional view (arrow view in the direction of line b-b) of the R-T-B based permanent magnet illustrated in FIG. 1A.

FIG. 1A is a perspective view of a rectangular parallelepiped permanent magnet 2 according to the present embodiment. FIG. 1B is a schematic view of a cross-section 2cs of the permanent magnet 2. The shape of the permanent magnet 2 is not limited to a rectangular parallelepiped. For example, the shape of the permanent magnet 2 may be, for example, a cube, a rectangular shape (plate), a polygonal prism, an arc segment, a fan, an annular sector, a sphere, a disc, a round column, a cylinder, a ring, or a capsule. The shape of the cross-section 2cs of the permanent magnet 2 may be, for example, a polygon, a circular arc (circular chord), a bow shape, an arch shape, a letter C shape, or a circle.

As illustrated in FIG. 1B, the permanent magnet 2 comprises a surface layer portion 21 and a central portion 22. The surface layer portion 21 is positioned on the surface side of the permanent magnet 2. The central portion 22 is positioned on the inner side of the permanent magnet 2. The surface layer portion 21 may be a region where a depth from the surface of the permanent magnet 2 is from 0 μm to 40 μm and main phase grains and an R'—O—C phase are contained. Only a portion of the surface of the permanent magnet 2 may be the surface layer portion 21. For example, in a case in which only a portion of the surface of the permanent magnet 2 is required to have corrosion resistance, only the portion required to have corrosion resistance may be the surface layer portion 21. The entire surface of the permanent magnet 2 may be the surface layer portion 21. The central portion 22 may be positioned at the center of the permanent magnet 2 in the thickness direction of the permanent magnet 2. The thickness of the permanent magnet 2 may be, for example, from 0.5 mm to 50 mm.

Figure 2:
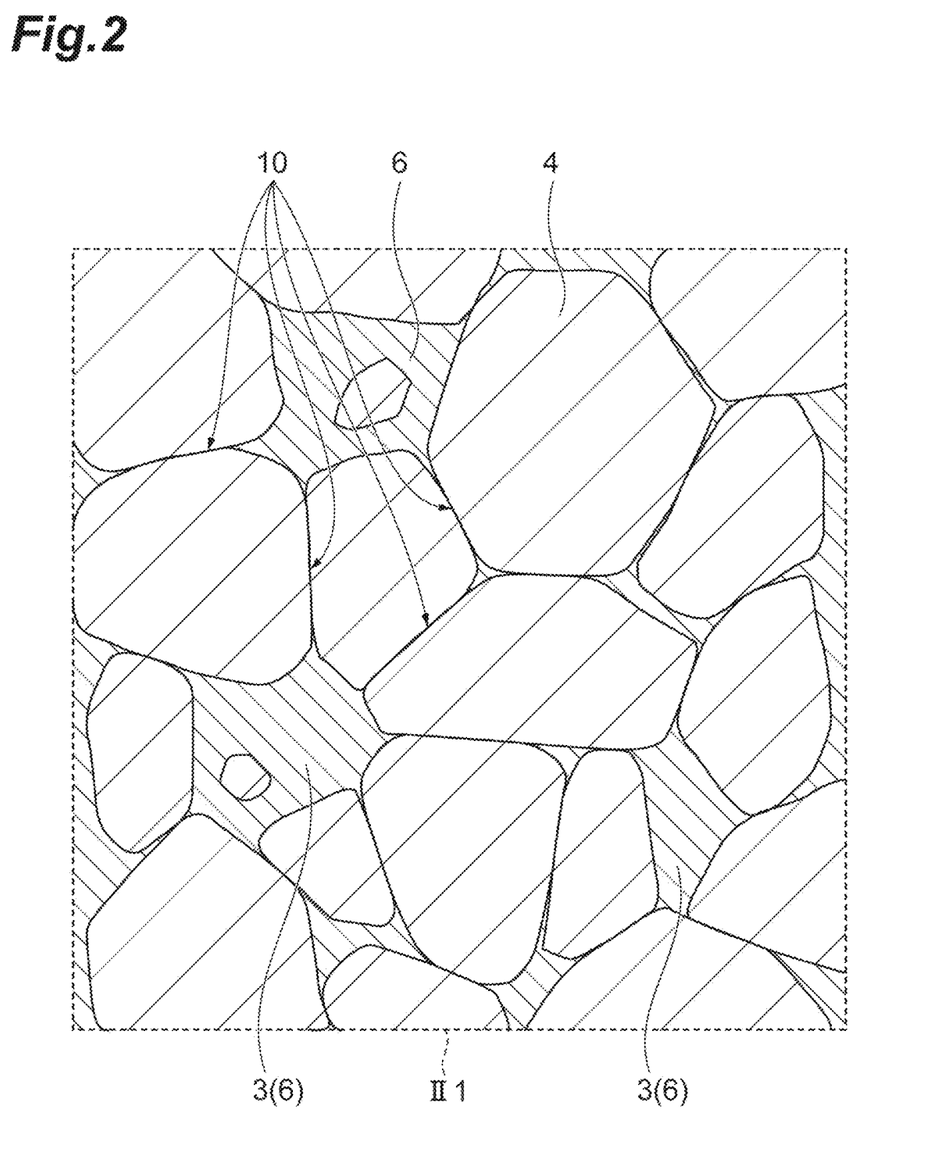
FIG. 2 is a schematic view of a cross-section (region II) of the surface layer portion of the R-T-B based permanent magnet illustrated in FIG. 1B.

Region III illustrated in FIG. 1B and FIG. 2 is a portion of a cross-section of the surface layer portion 21. The structure of the cross-section (region 112) of the central portion 22 illustrated in FIG. 1B may be the same as the structure of a cross-section of the surface layer portion 21 illustrated in FIG. 2, except for the proportion of the area of the R'—O—C phase occupying in the cross-section. As illustrated in FIG. 2, the permanent magnet 2 comprises a plurality (a large number) of main phase grains 4. The main phase grains 4 include at least Nd, T, and B. The main phase grains 4 may contain crystals of $R_2T_{14}B$. $R_2T_{14}B$ may be represented by, for example, $(Nd_{1-x}Pr_x)_2(Fe_{1-y}Co_y)_{14}B$. x may be 0 or more and less than 1. y may be 0 or more and less than 1. The main phase grains 4 may include a heavy rare earth element such as Tb or Dy in addition to a light rare earth element as R. A portion of B in $R_2T_{14}B$ may be substituted with carbon (C). The main phase grains 4 may include another element in addition to Nd, T, and B. The composition in the main phase grains 4 may be uniform. The composition in the main phase grains 4 may also be non-uniform. For example, the respective concentration distributions of R, T, and B in the main phase grains 4 may have a gradient.

The R-T-B based permanent magnet contains grain boundaries positioned between the main phase grains 4. The permanent magnet 2 may also contain a grain boundary multiple junction 6 as the grain boundary. A grain boundary multiple junction 6 is a grain boundary surrounded by three or more main phase grains 4. The permanent magnet 2 may contain a plurality (a large number) of grain boundary multiple junctions 6. The permanent magnet 2 may also contain a two-grain boundary 10 as the grain boundary. A two-grain boundary 10 is a grain boundary positioned between two main phase grains 4 that are adjacent to each other. The permanent magnet 2 may also contain a plurality (a large number) of two-grain boundaries 10.

At least a portion of the grain boundaries contains an R'—O—C phase 3. The R'—O—C phase 3 includes a rare earth element R', oxygen (O), and C. R' is at least one selected from the group consisting of Nd, Pr, Tb, and Dy. The concentration of each of R', O, and C in the R'—O—C phase 3 is higher compared to the main phase grains 4. That is, the concentration of R' in the R'—O—C phase 3 is higher than the concentration of R' in the main phase grains 4, the concentration of O in the R'—O—C phase 3 is higher than the concentration of O in the main phase grains 4, and the concentration of C in the R'—O—C phase 3 is higher than the concentration of C in the main phase grains 4. The concentration of R' is the sum of the concentrations of Nd, Pr, Tb, and Dy.

The grain boundaries may contain a grain boundary phase other than the R'—O—C phase 3. For example, the grain boundaries may contain an R'-rich phase. The R'-rich phase is a phase having a high concentration of R' compared to other grain boundary phases. The grain boundaries may also contain an oxide phase. The oxide phase is a phase that includes an oxide of R' as a main component and is different from the R'—O—C phase 3 in connection with the composition. In a case in which the permanent magnet 2 includes gallium (Ga), the grain boundaries may contain a transition-metal-rich phase. The transition-metal-rich phase is a phase that includes T, R', and Ga, in which the concentration of each of T and Ga is higher compared to other grain boundary phases.

Conventional R-T-B based permanent magnets are corroded by the following mechanism. However, the mechanism for corrosion is not limited to the following mechanism.

Water in the atmosphere (for example, water vapor) oxidizes the R'-rich phase in the grain boundaries at the surface of the permanent magnet. Oxidation of the R'-rich phase by water is represented by the following Reaction Formula 1. As shown by the following Reaction Formula 1, hydroxide of R' and hydrogen are produced by the oxidation of R' by water. This hydrogen is stored in the R'-rich phase that is not oxidized. In other words, R' in the R'-rich phase is hydrogenated, and hydride of R' is produced. Hydrogenation of R' in the R'-rich phase is represented by the following Reaction Formula 2. x in the Reaction Formula 2 is a positive real number that varies depending on the amount of stored hydrogen. The hydride of R' is prone to be oxidized by water. Oxidation of the hydride by water is represented by the following Reaction Formula 3. As shown by the following Reaction Formula 3, hydrogen is further produced by oxidation of the hydride of R' in addition to the hydrogen stored in the R'-rich phase (hydride). As these corrosion reactions proceed in a chain reaction, the permanent magnet expands. Along with expansion of the permanent magnet, water can easily penetrate into the permanent magnet through the grain boundaries. Furthermore, along with expansion of the permanent magnet, the main phase grains fall off from the surface of the permanent magnet. Due to the fall-off of the main phase grains, the R'-rich phase that is not corroded is exposed at the surface of the permanent magnet. As a result, corrosion further proceeds inside the permanent magnet.

$$2R' + 6H_2O \rightarrow 2R'(OH)_3 + 3H_2 \quad (1)$$

$$2R' + xH_2 \rightarrow 2R'H_x \quad (2)$$

$$2R'H_x + 6H_2O \rightarrow 2R'(OH)_3 + (3+x)H_2 \quad (3)$$

The R'—O—C phase 3 is hardly oxidized by water compared to the R'-rich phase. Furthermore, the R'—O—C phase 3 hardly store hydrogen compared to the R'-rich phase. Therefore, as the grain boundaries of the surface layer portion 21 contains the R'—O—C phase 3, production and storage of hydrogen in the grain boundaries are suppressed. In other words, as the grain boundaries of the surface layer portion 21 contains the R'—O—C phase 3, oxidation and hydrogenation of the R'-rich phase are suppressed. As a result, a chain reaction of the corrosion reactions described above is suppressed, and the progress of corrosion into the interior (central portion 22) of the permanent magnet 2 is suppressed.

The proportion of the area of the R'—O—C phase 3 occupying in a cross-section of the surface layer portion 21 is S1%. The proportion of the area of the R'—O—C phase 3 occupying in a cross-section of the central portion 22 is S2%. S1 is higher than S2. In other words, the proportion of the R'—O—C phase 3 occupying in the surface layer portion 21 is higher than the proportion of the R'—O—C phase 3 occupying in the central portion 22, and the R'—O—C phase 3 is localized in the surface layer portion 21 of the permanent magnet 2. Corrosion of the permanent magnet 2 gradually proceeds from the surface to the interior of the permanent magnet 2. Therefore, as the R'—O—C phase 3 is localized in the surface layer portion 21 of the permanent magnet 2, corrosion of the permanent magnet 2 is effectively suppressed. On the other hand, as the amount of the R'—O—C phase 3 is larger, the amount of the R'-rich phase in the grain boundaries is reduced, and therefore, the coercivity of the permanent magnet 2 tends to be easily decreased. However, S2 is lower than S1. In other words, the proportion of the R'—O—C phase 3 occupying in the central portion 22 is lower than the proportion of the R'—O—C phase 3 occupying in the surface layer portion 21. As a result, a decrease in the coercivity of the permanent magnet 2 associated with the inclusion of the R'—O—C phase 3 is suppressed. Therefore, the coercivity of the permanent magnet 2 according to the present embodiment is higher compared to a permanent magnet in which the R'—O—C phase 3 is uniformly distributed.

As the value of S1-S2 is larger, corrosion of the permanent magnet 2 is easily suppressed in the surface layer portion 21, and a decrease in the coercivity of the permanent magnet 2 associated with the inclusion of the R'—O—C phase 3 is easily suppressed. From such a reason, the value of S1-S2 may be from 1.0 to 80, or from 2.6 to 38.2.

S1 may be from 4.3 to 80, or from 5.9 to 41.5. In a case in which S1 is more than or equal to the lower limit described above, corrosion of the permanent magnet 2 is easily suppressed. In a case in which S1 is less than or equal to the upper limit described above, the surface layer portion 21 can contain a sufficient amount of the R'-rich phase, and a decrease in the coercivity of the permanent magnet 2 is easily suppressed. However, S1 is not limited to the above-described range. S2 may be, for example, 0 or more and less than 4.3, or from 0 to 3.3. As S2 is smaller, a decrease in the coercivity of the permanent magnet 2 associated with the inclusion of the R'—O—C phase 3 is easily suppressed. However, S2 is not limited to the range described above as long as it is smaller than S1.

As illustrated in FIG. 1B, the cross-section of the surface layer portion 21 in which S1 is measured and the cross-section of the central portion 22 in which S2 is measured may be contained in an identical cross-section 2cs of the permanent magnet. The cross-section of the surface layer portion 21 in which S1 is measured and the cross-section of the central portion 22 in which S2 is measured may not be contained in an identical cross-section 2cs of the permanent magnet 2. The details of the measurement method for S1 and S2 will be described below.

The R'—O—C phase 3 may further include other elements in addition to R', O, and C. For example, at least a portion of the R'—O—C phase 3 may further include N (nitrogen). In a case in which the permanent magnet 2 includes N, the R'—O—C phase 3 is likely to include N. As the R'—O—C phase 3 includes N, production and storage of hydrogen in the grain boundaries are easily suppressed. Only a portion of the R'—O—C phase 3 contained in the permanent magnet 2 may include N. The entire R'—O—C phase 3 contained in the permanent magnet 2 may include N. The entire R'—O—C phase 3 contained in the permanent magnet 2 may not include N. The R'—O—C—N phase that will be described below means an R'—O—C phase 3 including N.

The concentration of R' in the R'—O—C phase 3 may be, for example, from 30 atom % to 55 atom %. The concentration of O in the R'—O—C phase 3 may be, for example, from 10 atom % to 50 atom %. The concentration of C in the R'—O—C phase 3 may be, for example, from 5 atom % to 30 atom %. The concentration of N in the R'—O—C phase 3 may be, for example, from 0 atom % to 30 atom %. The concentration of R' in the R'—O—C phase 3 may be represented by [R'] atom %. The concentration of O in the R'—O—C phase 3 may be represented by [O] atom %. The concentration of N in the R'—O—C phase 3 may be represented by [N] atom %. [O]/[R'] may be more than 0 and less than 1.0, more than 0.4 and less than 0.7, or more than 0.5 and less than 0.7. In a case in which [O]/[R'] is in the above-described range, oxidation and hydrogenation of the R'-rich phase are easily suppressed, and a decrease in the coercivity of the permanent magnet 2 associated with the inclusion of the R'—O—C phase 3 is easily suppressed. For the same reason, [N]/[R'] may be more than 0 and less than 1.0. At least a portion of the R'—O—C phase 3 may have cubic crystals. Since the R'—O—C phase 3 has cubic crystals, production and storage of hydrogen in the grain boundaries are easily suppressed.

The average grain size or D50 of the main phase grains 4 is not particularly limited; however, for example, the average grain size may be from 1.0 µm to 10.0 µm, or from 1.5 µm to 6.0 µm. The sum of the proportions of volume of the main phase grains 4 in the permanent magnet 2 is not particularly limited; however, for example, the sum may be 80% by volume or more and less than 100% by volume.

The respective compositions of the main phase grains 4 and the grain boundary phase may be specified by respective analyses of the main phase grains 4 and the grain boundary phase exposed at the cross-section 2cs of the permanent magnet 2. The main phase grains 4 and the grain boundary phase exposed at the cross-section 2cs of the permanent magnet 2 are easily identified on the basis of the signal intensity of a backscattered electron image imaged by an electron beam probe microanalyzer (EPMA). The respective compositions of the main phase grains 4 and the grain boundary phase may also be analyzed by an electron beam probe microanalyzer (EPMA) or energy dispersive X-ray spectroscopy (EDS).

The specific composition of the permanent magnet 2 as a whole will be explained below. However, the composition of the permanent magnet 2 is not limited to the following composition. As long as the effect of the present invention attributed to the R'—O—C phase 3 described above is obtained, the contents of the various elements in the permanent magnet 2 may be out of the following ranges.

The content of O in the permanent magnet may be from 0.03% by mass to 0.4% by mass, or from 0.05% by mass to 0.2% by mass. In a case in which the content of O is too small, the R'—O—C phase is hardly formed. In a case in which the content of O is too large, the coercivity of the permanent magnet is prone to be decreased.

The content of C in the permanent magnet may be from 0.03% by mass to 0.3% by mass, or from 0.05% by mass to 0.15% by mass. In a case in which the content of C is too small, the R'—O—C phase is hardly formed. In a case in which the content of C is too large, the coercivity of the permanent magnet is easily decreased.

The content of N in the permanent magnet may be from 0% by mass to 0.15% by mass, or from 0.03% by mass to 0.10% by mass. In a case in which the content of N is too small, there is a tendency that the R'—O—C phase is hardly formed. In a case in which the content of N is too large, the coercivity of the permanent magnet is easily decreased. The permanent magnet may not include N.

The content of R in the permanent magnet may be 25% to 35% by mass, or 29% to 34% by mass. In a case in which the permanent magnet includes a heavy rare earth element as R, the total content of all rare earth elements including the heavy rare earth element may be 25% to 35% by mass, or 29% to 34% by mass. When the content of R is in this range, the residual magnetic flux density and coercivity tend to increase. In a case in which the content of R is too small, the main phase grains ($R_2T_{14}B$) are hardly formed, and an α-Fe phase having soft magnetic properties is likely to be formed. As a result, the coercivity tends to decrease. On the other hand, in a case in which the content of R is too large, the volume proportion of the main phase grains is lowered, and the residual magnetic flux density tends to decrease. Since the residual magnetic flux density and coercivity are easily increased, the sum of the proportions of Nd and Pr in all of the rare earth elements R may be 80 atom % to 100 atom %, or 95 atom % to 100 atom %.

The content of B in the permanent magnet may be 0.5% to 1.5% by mass, or 0.75% to 0.98% by mass. In a case in which the content of B is too small, the $R_2T_{17}$ phase is easily precipitated out, and the coercivity tends to decrease. On the other hand, in a case in which the content of B is too large, the residual magnetic flux density of the permanent magnet is easily decreased.

The permanent magnet may also include Co. The content of Co in the permanent magnet may be 0.1% to 4.0% by mass, or 0.3% to 2.5% by mass. As the permanent magnet includes Co, the Curie temperature of the permanent magnet is likely to increase. Furthermore, as the permanent magnet includes Co, the corrosion resistance of the grain boundary phase is likely to be enhanced, and the corrosion resistance of the permanent magnet as a whole is likely to be enhanced.

The permanent magnet may also include aluminum (Al). The content of Al in the permanent magnet may be 0.03% to 0.6% by mass, or 0.1% to 0.4% by mass. As the content of Al is in the above-described range, the coercivity and corrosion resistance of the permanent magnet are likely to be enhanced.

The permanent magnet may also include copper (Cu). The content of Cu in the permanent magnet may be 0.03% to 1.5% by mass, or 0.05% to 0.6% by mass. When the content of Cu is in the above-described range, the coercivity, corrosion resistance, and temperature characteristics of the permanent magnet are likely to be enhanced.

The balance excluding the above-mentioned elements from the permanent magnet may be Fe only, or Fe and other elements. In order for the permanent magnet to have sufficient magnetic characteristics, the sum of the contents of elements other than Fe in the balance may be 0% to 5% by mass with respect to the total mass of the permanent magnet.

The permanent magnet may also include at least one selected from the group consisting of zirconium (Zr), silicon (Si), gallium (Ga), titanium (Ti), vanadium (V), chromium (Cr), manganese (Mn), nickel (Ni), niobium (Nb), molybdenum (Mo), hafnium (Hf), tantalum (Ta), tungsten (W), bismuth (Bi), tin (Sn), calcium (Ca), chlorine (Cl), sulfur (S), and fluorine (F), as the other element.

The composition of the permanent magnet as a whole may be analyzed by, for example, an X-ray fluorescence (XRF) analysis method, a high-frequency inductively coupled plasma (ICP) emission spectrometry method, an inert gas fusion-non-dispersive infrared absorption (NDIR) method, a combustion in oxygen gas-infrared absorption method, and a combustion in inert gas-thermal conductivity method.

The permanent magnet according to the present embodiment may be applied to motors, power generators, actuators, and the like. For example, the permanent magnet is utilized in various fields such as hybrid cars, electric cars, hard disk drives, magnetic resonance imaging apparatuses (MRI), smart phones, digital cameras, slim-type TVs, scanners, air-conditioners, heat pumps, refrigerators, vacuum cleaners, washing and drying machines, elevators, and wind power generators.

(Method for Producing Permanent Magnet)

A method for producing the above-described permanent magnet will be explained below.

A raw material alloy is produced from metals (raw material metals) including various elements that constitute the permanent magnet described above. The raw material alloy may be produced according to a strip casting method, a book mold method, or a centrifugal casting method. The raw material metal may be, for example, a simple substance of a rare earth element (simple substance of metal), pure iron, ferroboron, or an alloy including these. These raw material metals are weighed so as to approximately match the desired composition of the permanent magnet. One kind of raw material alloy may be used, or a plurality of kinds of raw material alloys may also be used. It is preferable that the raw material alloys are not mixed with oxides. In a case in which a mixture of a raw material alloy and an oxide is used for the raw material of the permanent magnet, an excess amount of the R'—O—C phase is likely to be formed in the central portion of the permanent magnet, S2 is likely to increase, and it is difficult to produce a permanent magnet in which S1 is higher than S2. For the same reason, it is preferable that the raw material alloy is not mixed with carbon or a carbide, and it is preferable that the raw material alloy is not mixed with a nitride.

By pulverizing each of the raw material alloys described above, an alloy powder is obtained. The raw material alloy may be pulverized in two stages of a coarsely pulverizing step and a finely pulverizing step. The respective following steps may be carried out in a non-oxidative atmosphere in which the oxygen concentration is less than 100 ppm.

In the coarsely pulverizing step, a raw material alloy is pulverized until the particle size of the raw material alloy reaches about several hundred micrometers (μm) or several millimeters (mm). As the coarsely pulverizing step, hydrogen storage pulverization may be carried out. In the hydrogen storage pulverization, hydrogen is stored in the raw material alloy. After the storage of hydrogen, hydrogen is eliminated from the raw material alloy by heating of the raw material alloy. As a result of the elimination of hydrogen from the raw material alloy, the raw material alloy is pulverized. In the coarsely pulverizing step, the raw material alloy having hydrogen stored therein may be heated in an atmosphere including nitrogen. An R'—O—C—N phase is easily formed in the permanent magnet by heating the raw material alloy storing hydrogen in the atmosphere including nitrogen. The concentration of nitrogen in the atmosphere may be, for example, from 200 ppm by volume to 1,000 ppm by volume. In a case in which the content of nitrogen is in the range described above, an R'—O—C—N phase is easily formed. In the coarsely pulverizing step, the raw material alloy may be pulverized according to a mechanical method. The mechanical method may be, for example, a disk mill, a jaw crusher, a Brown mill, or a stamp mill.

In the finely pulverizing step that is subsequent to the coarsely pulverizing step, the raw material alloy is further pulverized until the average particle size of the raw material alloy reaches 0.1 to 10.0 μm. In the finely pulverizing step, for example, a pulverizing apparatus such as a jet mill or a bead mill may be used. In the finely pulverizing step, a pulverization aid (lubricating agent) may be added to the raw material alloy. As a result of the addition of a pulverization aid, aggregation of the raw material alloy and attachment of the raw material alloy to the pulverization apparatus are suppressed. The pulverization aid may be, for example, at least one organic compound selected from the group consisting of a fatty acid ester, an amine carboxylate, an aliphatic amine, a fatty acid, and a fatty acid amide. Jet milling may be performed in an atmosphere including nitrogen gas. In a case in which the atmosphere of jet milling includes nitrogen gas, an R'—O—C—N phase is likely to be formed in the permanent magnet.

In a molding step, a green compact is obtained by molding an alloy powder in a magnetic field. For example, a green compact is obtained by placing a raw material alloy powder in a mold and pressing the alloy powder with the mold while applying a magnetic field thereto. The pressure applied to the alloy powder by the mold may be from 30 MPa to 300 MPa. The strength of the magnetic field that is applied to the alloy powder may be from 950 kA/m to 1,600 kA/m. A mixture (slurry) of an alloy powder and an organic solvent may be molded. That is, a green compact may be formed by wet molding.

In a sintering step, a sintered body is obtained by sintering the green compact in a sintering furnace. The atmosphere inside the sintering furnace may be a vacuum or an inert gas. The general conditions for the sintering step may be appropriately set according to the composition of the target permanent magnet, the pulverization method and particle size of the raw material alloy, and the like.

The sintering step has a temperature increasing process and a sintering process. In the temperature increasing process, the temperature inside the sintering furnace increases from room temperature to the sintering temperature Ts. In the sintering process, the green compact is continuously heated to Ts. The sintering temperature Ts may be higher than 900° C. and 1,200° C. or lower. The duration time of the sintering process may be, for example, from 1 hour to 30 hours. In the temperature increasing process, at a time point when the temperature inside the sintering furnace is from 800° C. to 900° C., carbon monoxide (CO) gas is introduced into the sintering furnace. A mixed gas of CO and argon (Ar) may be introduced into the sintering furnace. In a temperature region of from 800° C. to 900° C., since densification of the green compact has not yet progressed, many pores are formed inside the green compact. Therefore, CO gas can penetrate into the green compact through the pores from the surface to a certain depth of the green compact. Then, as CO reacts with the rare earth element R' in the green compact, an R'—O—C phase is produced from the surface to a certain depth of the green compact. In a region close to the surface of the green compact, the R'—O—C phase is likely to be formed, and in a region distant from the surface of the green compact, the R'—O—C phase is hardly formed. That is, at the surface layer portion of the green compact, the R'—O—C phase is easily formed, and at the central portion of the green compact, the R'—O—C phase is hardly formed. In a case in which the green compact includes oxygen, carbon, or nitrogen as impurities, these elements are also incorporated into the R'—O—C phase. As the temperature inside the sintering furnace increases to the sintering temperature Ts, densification of the green compact proceeds, and grain boundaries containing the R'—O—C phase are formed. Through the above-described processes, a surface layer portion containing a large amount of the R'—O—C phase is formed in a portion or the entire region of the surface of the permanent magnet (sintered body). After the alloy powder particles are sintered, and the green compact is densified, it is difficult for CO gas to penetrate to the interior of the green compact, and a surface layer portion containing a large amount of the R'—O—C phase is difficult to form. After the green compact has been densified, CO gas reacts with a liquid phase that has exuded from the interior of the sintered body (for example, a liquid phase of R'), and a coating film is formed on the surface of the green compact.

In the temperature increasing process of the sintering step, the temperature inside the sintering furnace may continuously increase from room temperature to the sintering temperature Ts. Concomitantly with the introduction of CO gas into the sintering furnace, the temperature inside the sintering furnace may be maintained at a particular temperature of from 800° C. to 900° C. for a certain time period. In the temperature increasing process, nitrogen gas may be introduced into the sintering furnace together with CO gas. This nitrogen gas may be incorporated into the R'—O—C phase.

In an aging treatment step, the sintered body may be further heated. In the aging treatment step, the magnetic characteristics of the sintered body are enhanced. The atmosphere of the aging treatment step may be a vacuum or an inert gas. In the aging treatment step, the sintered body may be heated at about 600° C. for 1 to 3 hours. Multiple stages of the aging treatment step may be carried out. For example, in a first aging treatment, the sintered body may be heated at 700° C. to 950° C. for 1 to 3 hours, and in a second aging treatment that is subsequent to the first aging treatment, the sintered body may be heated at 450° C. to 700° C. for 1 to 3 hours. The aging treatment step may be carried out subsequently to the sintering step.

The sintered body may be rapidly cooled by a cooling step that is subsequent to the aging treatment step. The sintered body may be rapidly cooled in an inert gas such as Ar gas. The cooling rate for the sintered body may be, for example, from 5° C./min to 100° C./min.

In a processing step, the dimension and shape of the sintered body may be adjusted by cutting, polishing, and the like. The sintered body (substrate) obtained according to the above-described method may not include a heavy rare earth element. That is, the sintered body before a diffusion step may not include a heavy rare earth element. The sintered body before the diffusion step may already include a heavy rare earth element. The following diffusion step may be carried out irrespective of the presence or absence of a heavy rare earth element in the sintered body. However, the diffusion step is not essential.

In a case in which a permanent magnet including a heavy rare earth element is produced, the diffusion step may be carried out. In the diffusion step, a heavy rare earth element or a compound thereof is attached to the surface of the sintered body, and then the sintered body may be heated. For example, A compound such as fluoride, oxide, or hydride of a heavy rare earth element may be attached to the surface of the sintered body. The sintered body may be heated in vapor including a heavy rare earth element. Through the diffusion step, the heavy rare earth element diffuses from the surface to the interior of the sintered body, and the heavy rare earth element is further diffused to the surface of the main phase grains via the grain boundaries.

A coating material including a heavy rare earth element may be applied on the surface of the sintered body. As long as the coating material includes a heavy rare earth element, the composition of the coating material is not limited. The coating material may also include, for example, a simple substance of a heavy rare earth element, an alloy including a heavy rare earth element, or a compound such as fluoride, oxide, or hydride. The solvent (dispersing medium) to be included in the coating material may be a solvent other than water. For example, the solvent may be an organic solvent such as an alcohol, an aldehyde, or a ketone. The concentration of the heavy rare earth element in the coating material is not limited.

The diffusion treatment temperature in the diffusion step may be from 800° C. to 950° C. The diffusion treatment time may be from 1 hour to 50 hours. When the diffusion treatment temperature and the diffusion treatment time are in the ranges described above, the concentration distribution of the heavy rare earth element can be easily controlled, and the production cost for the permanent magnet is reduced. The diffusion step may also function as the aging treatment step described above.

After the diffusion step, the permanent magnet may be further subjected to a heat treatment. The heat treatment temperature after the diffusion step may be from 450° C. to 600° C. The heat treatment time may be from 1 hour to 10 hours. Through the heat treatment after the diffusion step, the magnetic characteristics (particularly, coercivity) of the permanent magnet that is finally obtained are likely to be enhanced.

After the diffusion step, the dimension and shape of the sintered body may be adjusted by cutting, grinding, and the like.

The order of the heat treatment step, the processing step, and the diffusion step is not limited.

A portion of the surface layer portion may be removed from the surface of the sintered body by etching. That is, the thickness of the surface layer portion may be adjusted by etching. A passive layer may be formed on the surface of the sintered body by an oxidation or chemical treatment of the surface of the sintered body. The surface of the sintered body may be covered with a resin film. The corrosion resistance of the permanent magnet is further enhanced by formation of a passive layer or a resin film.

By means of the methods described above, the permanent magnet according to the present embodiment is obtained.

The present invention is not intended to be limited to the embodiment described above. For example, the R-T-B based permanent magnet may be a hot-deformed magnet.

Examples

Hereinafter, the present invention will be described in more detail by way of Examples; however, the present invention is not intended to be limited to the following Examples.

Example 1

[Production of Permanent Magnet]

A raw material alloy in a flaky form was produced from a plurality of raw material metals by a strip casting method. In order for the respective contents of Nd, Co, Al, Cu, B, and Fe in the raw material alloy to be consistent with the following values, the respective raw material metals were weighed.

Content of Nd: 31.0% by mass.
Content of Co: 0.50% by mass.
Content of Al: 0.20% by mass.
Content of Cu: 0.08% by mass.
Content of B: 0.95% by mass.
Content of Fe: balance.

The following various steps from the coarsely pulverizing step to the sintering step were carried out in a non-oxidative atmosphere in which the oxygen concentration was less than 50 ppm.

In the coarsely pulverizing step, hydrogen was stored in the raw material alloy at room temperature. The raw material alloy was heated for 1 hour at 600° C. in a gas stream of Ar to remove hydrogen, and thereby a coarse powder was obtained.

In the finely pulverizing step, the coarse powder and an oleic acid amide (pulverization aid) were mixed in a conical mixing machine. The amount of addition of the oleic acid amide was 0.1 parts by mass with respect to 100 parts by mass of the coarse powder. The coarse powder mixed with the oleic acid amide was pulverized with a jet mill, and thereby a fine powder was obtained. As the gas stream of the jet mill, nitrogen gas was used. By regulating the classification conditions of the jet mill, the average particle size of the fine powder was adjusted to about 4 μm.

In the molding step, the fine powder was filled in a mold. Then, while a magnetic field of 1,200 kA/m was applied to the fine powder in the mold, the fine powder was pressed at 120 MPa, and thereby a green compact was obtained.

The green compact was installed in a sintering furnace. In the sintering step, Ar gas was continuously introduced into the sintering furnace, except for the time period in which the temperature of the atmosphere in the sintering furnace was from 800° C. to 900° C. The gas pressure in the furnace was constantly controlled to 50 Pa. The sintering step had a temperature increasing process and a sintering process that was subsequent to the temperature increasing process. In the temperature increasing process, the temperature of the atmosphere in the sintering furnace was increased from room temperature to 1,060° C. (sintering temperature). In the temperature increasing process, a mixed gas of Ar and CO was introduced into the sintering furnace, instead of Ar gas, until the temperature of the atmosphere in the sintering furnace reached 800° C. to 900° C. The ratio of the volume of Ar and the volume of CO was 2:1. The rate of temperature increase in the temperature increasing process was 4° C./min. In the sintering process, the green compact was heated for 4 hours at 1,060° C., and thereby a sintered body was obtained. Subsequently to the sintering process, the sintered body was rapidly cooled.

After rapid cooling of the sintered body, a first aging treatment and a second aging treatment that was subsequent to the first aging treatment were carried out. In both of the first aging treatment and the second aging treatment, the sintered body was heated in Ar gas. In the first aging treatment, the sintered body was heated for 1 hour at 850° C. In the second aging treatment, the sintered body was heated for 1 hour at 540° C. The dimension of the sintered body thus obtained was a longitudinal width of 18 mm×a transverse width of 12 mm×a thickness of 6 mm. That is, the sintered body was a rectangular parallelepiped.

In the etching treatment step, the sintered body was immersed in an aqueous solution of nitric acid. The concentration of nitric acid in the aqueous solution was 3% by mass. Through the etching treatment step, a region in which the depth from the surface of the sintered body was 10 μm or less was removed from the entire surface of the sintered body. After the etching treatment step, ultrasonic cleaning of the sintered body in pure water was carried out.

A permanent magnet of Example 1 was produced by the above-described method.

[Analysis of Permanent Magnet]

<Analysis of Cross-Sectional Texture>

The permanent magnet was cut perpendicularly to the surface thereof. Therefore, the outer periphery of a cross-section of the permanent magnet corresponds to the surface of the permanent magnet. The cross-section of the permanent magnet was polished by ionic milling, and impurities such as oxides formed on the cross-section were removed. After the removal of impurities, an area analysis of the cross-section of the permanent magnet by EPMA was carried out. The analyzed region was a region in which the distance from the outer periphery of the cross-section was 140 pin or less. That is, the analyzed region was a region in which the depth from the surface of the permanent magnet was 140 μm or less. The width of the analyzed region in a direction parallel to the outer periphery of the cross-section was 40 μm. That is, the width of the analyzed region in a direction parallel to the surface of the permanent magnet was 40 μm. As a result of the above-described area analysis, a backscattered electron image in the analyzed region was obtained, and the mapping of Nd, C, N, and O was respectively carried out.

Figure 3:
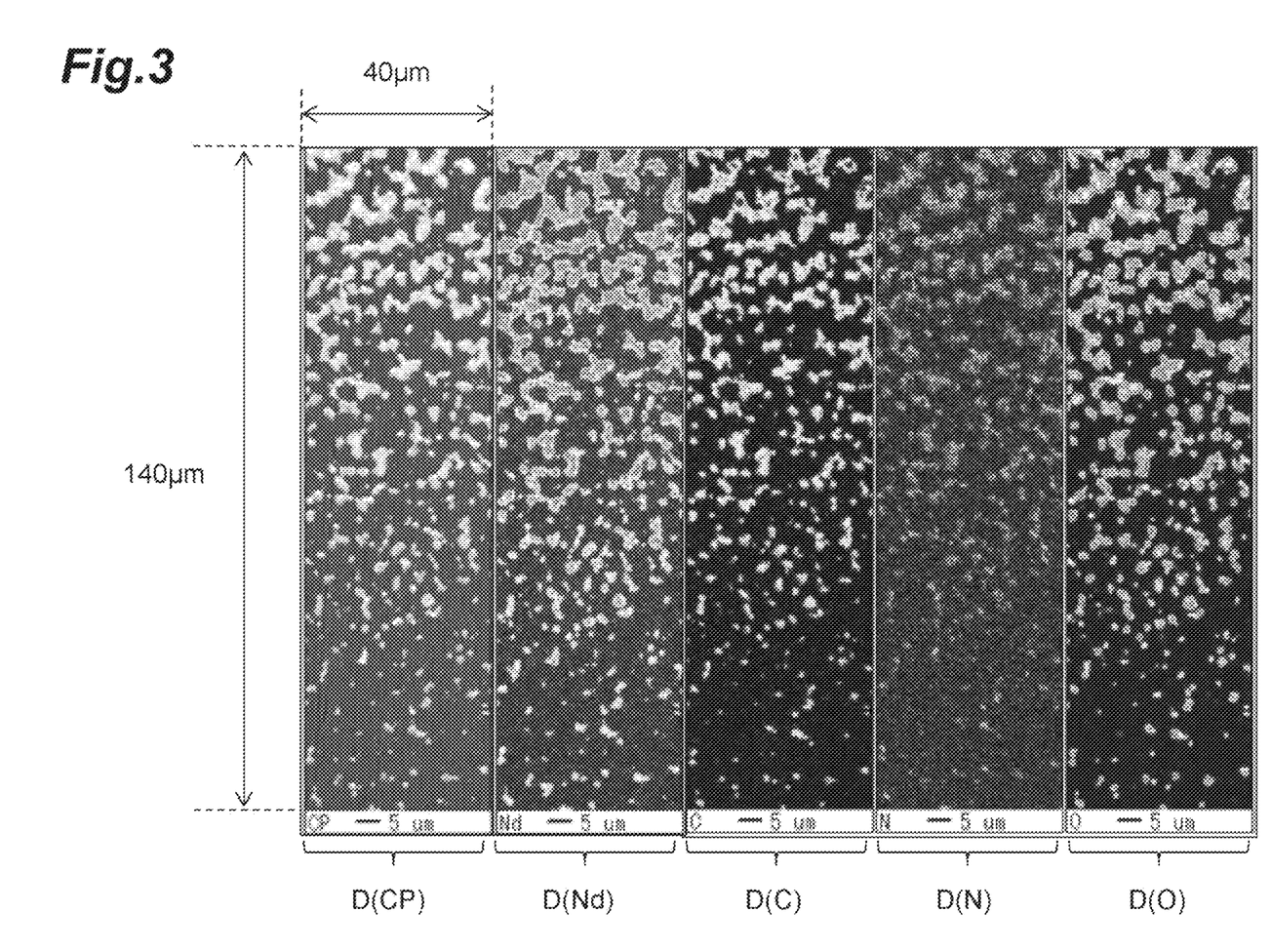
FIG. 3 is a distribution view of various elements in the vicinity of the surface layer portion of the R-T-B based permanent magnet of Example 1.

A backscattered electron image D (CP) in the analyzed region is shown in FIG. 3. The backscattered electron image shows that the permanent magnet contains a plurality of main phase grains and grain boundaries positioned between the main phase grains. A point analysis of the main phase grains by EPMA was carried out. The results of the point analysis show that the respective main phase grains include at least Nd, Fe, and B.

A distribution view of Nd (D(Nd)) in the analyzed region is shown in FIG. 3. The white parts in D(Nd) are parts in which characteristic X-rays of Nd were strongly detected. A distribution view of C (D(C)) in the analyzed region is shown in FIG. 3. The white parts in D(C) are parts in which characteristic X-rays of C were strongly detected. A distribution view of N (D(N)) in the analyzed region is shown in FIG. 3. The white parts in D(N) are parts in which characteristic X-rays of N were strongly detected. A distribution view of O (D(O)) in the analyzed region is shown in FIG. 3. The white parts in D(O) are parts in which characteristic X-rays of O were strongly detected. The upper end of FIG. 3 corresponds to the outer periphery of the cross-section (surface of the permanent magnet). The lower end of FIG. 3 corresponds to the interior of the permanent magnet. As shown in FIG. 3, the distribution of each of Nd, C, N, and O was almost consistent with one another. That is, the distribution views of the respective elements show that an R'—O—C phase is contained in the permanent magnet, and the distribution views of the respective elements show that the R'—O—C phase is likely to include N. As shown in FIG. 3, a region in which the depth from the outer periphery of the cross-section (surface of the permanent magnet) was 100 μm or less contained a large amount of the R'—O—C phase compared to other regions.

S1 and S2 of Example 1 were measured by the following method. The "surface layer portion" described below is a region in which the distance from the outer periphery of the cross-section of the permanent magnet is 40 μm or less, and the width in a direction parallel to the outer periphery of the cross-section is 40 μm. That is, the "surface layer portion" is a region in which the depth from the surface of the permanent magnet is 40 μm or less, and the width in a direction parallel to the surface is 40 μm. The "central portion" described below is a portion randomly selected from within a region in which the distance from the outer periphery of the cross-section of the permanent magnet is from 2,000 μm to 3,000 μm. That is, the "central portion" is a portion randomly selected from within a region in which the depth from the surface of the permanent magnet is from 2,000 μm to 3,000 μm. The central portion was square, and the dimension was 40 μm×40 μm.

<<Step 1>>

A backscattered electron image of the surface layer portion captured by EPMA was binarized, and thereby the respective positions of the main phase grains and grain boundaries were specified. The backscattered electron image was binarized on the basis of the signal intensity of the backscattered electron image. As the atomic number of an element is larger, the signal intensity originating from the element is higher. Along with an increase in the concentration of an element, the signal intensity originating from the element increases. The atomic number of Nd is larger than the atomic numbers of the other elements included in the permanent magnet. Furthermore, the concentration of Nd in the grain boundaries is higher than the concentration of Nd in the main phase grains. Therefore, the main phase grains and the grain boundaries were identified on the basis of the difference in the signal intensities originating from Nd. Binarization of the backscattered electron image was carried out by means of a software program (Adobe Photoshop) manufactured by Adobe Systems, Inc.

<<Step 2>>

By mapping using EPMA, the average value Ia and the standard deviation σ of the intensity of each of characteristic X-rays of Nd, O, C, and N in the main phase grains contained in the surface layer portion was calculated.

<<Step 3>>

The position of a portion (Nd-concentrated portion) in which the intensity of characteristic X-rays of Nd in the surface layer portion was higher than (Ia+3σ) of Nd was specified by EPMA. The position of a portion (O-concentrated portion) in which the intensity of characteristic X-rays of O in the surface layer portion was higher than (Ia+3σ) of O was specified by EPMA. The position of a portion (C-concentrated portion) in which the intensity of characteristic X-rays of C in the surface layer portion was higher than (Ia+3σ) of C was specified by EPMA. The position of a portion (N-concentrated portion) in which the intensity of characteristic X-rays of N in the surface layer portion was higher than (Ia+3σ) of N was specified by EPMA.

<<Step 4>>

Based on the results of Step 1 and Step 3, the parts where all of the grain boundary, the Nd-concentrated portion, the O-concentrated portion, and the C-concentrated portion overlap with one anther were specified. A part where all of the grain boundary, the Nd-concentrated portion, the O-concentrated portion, and the C-concentrated portion overlap with one another corresponds to the R'—O—C phase contained in the grain boundaries of the surface layer portion. The sum of areas (A1) of the R'—O—C phase contained in the grain boundaries of the surface layer portion was calculated. The position of the R'—O—C phase was almost consistent with the position of a concentrated portion of N.

<<Step 5>>

A1 was divided by the entire area (B1) of the surface layer portion, and thereby S1 was calculated. That is, S1 is (A1/B1)×100. B1 is 40 n×40 μm.

S1 values of five sites in the surface layer portion were calculated by the above-described method. The five sites were randomly selected from the surface layer portion. The average value of S1 of the five sites in the surface layer portion is presented in Table 1. S1 described below means the average value of S1.

The R'—O—C phase contained in the grain boundaries of the central portion was specified by a method similar to the method described above. The sum of areas (A2) of the R'—O—C phase contained in the grain boundaries of the central portion was calculated. A2 was divided by the entire area B2 of the central portion, and thereby S2 was calculated. That is, S2 is (A2/B2)×100. B2 is 40 μm×40 μm. S2 values of five sites in the central portion were calculated by the method described above. The five sites were randomly selected from the central portion. The average value of S2 of the five sites in the central portion is presented in Table 1. S2 described below means the average value of S2.

<Measurement of Coercivity>

The permanent magnet was cut in a direction perpendicular to the surface thereof, and thereby the dimension of the permanent magnet was adjusted to a longitudinal width of 7 mm×a transverse width of 7 mm. The dimension in the thickness direction of the permanent magnet was not adjusted. After the adjustment of the dimension, the coercivity (HcJ) of the permanent magnet at room temperature was measured. The unit of HcJ is kA/m. For the measurement of HcJ, a pulse excitation type B-H tracer (TPM-2-10) manufactured by Toei Industry Co., Ltd. HcJ of Example 1 is presented in Table 1.

<Evaluation of Corrosion Resistance>

The corrosion resistance of the permanent magnet was evaluated by a saturated pressure cooker test (PCT). In the PCT, the permanent magnet was left to stand in saturated water vapor at 0.2 MPa, a temperature of 120° C., and a humidity of 100% RH. As the permanent magnet is corroded by saturated water vapor, the main phase grains and the grain boundary phase are detached from the surface of the permanent magnet, and the weight of the permanent magnet is reduced. The weight of the permanent magnet was measured after every 20 hours, and the time tc when a rapid decrease in the weight of the permanent magnet began to occur was measured. tc is the time in which the amount of weight reduction per unit area, Δw, of the permanent magnet is more than 3 mg/cm$^2$. tc of Example 1 is presented in the following Table 1. The number "500" described as tc in the following Table 1 means that even after 500 hours, Δw did not exceed 3 mg/cm$^2$. A tc of less than 500 hours means a time point at which Δw exceeded 3 mg/cm$^2$.

Examples 2 to 5

The etching treatment step of each of Examples 2 to 5 was different from the etching step of Example 1 in the time for immersing the sintered body in an aqueous solution of nitric acid.

In the etching treatment step of Example 2, a region in which the depth from the surface of the sintered body was 40 μm or less was removed from the entire surface of the sintered body.

In the etching treatment step of Example 3, a region in which the depth from the surface of the sintered body was 80 μm or less was removed from the entire surface of the sintered body.

In the etching treatment step of Example 4, a region in which the depth from the surface of the sintered body was 100 μm or less was removed from the entire surface of the sintered body.

In the etching treatment step of Example 5, a region in which the depth from the surface of the sintered body was 120 μm or less was removed from the entire surface of the sintered body.

The permanent magnet of each of Examples 2 to 5 was produced by a method similar to Example 1, except for the etching treatment step. The permanent magnet of each of Examples 2 to 5 was analyzed by a method similar to Example 1.

In all cases of Examples 2 to 5, the permanent magnet contained a plurality of main phase grains and grain boundaries positioned between the main phase grains. In all cases of Examples 2 to 5, the various main phase grains included at least Nd, Fe, and B. In all cases of Examples 2 to 5, a portion of the grain boundaries contained an R'—O—C phase. The respective S1, S2, tc, and HcJ of Examples 2 to 5 are presented in Table 1.

Comparative Example 1

A region in which the depth from the surface of the sintered body was 0.5 μm or less was removed from the entire surface of the sintered body by grinding work before the etching treatment step. A permanent magnet of Comparative Example 1 was produced by a method similar to Example 1, except for the grinding work. The permanent magnet of Comparative Example 1 was analyzed by a method similar to Example 1.

The permanent magnet of Comparative Example 1 contained a plurality of main phase grains and grain boundaries positioned between the main phase grains. The respective main phase grains included at least Nd, Fe, and B. A portion of the grain boundaries contained an R'—O—C phase. S1, S2, tc, and HcJ of Comparative Example 1 are presented in Table 1.

Comparative Example 2

In the sintering step of Comparative Example 2, Ar gas was continuously introduced into the sintering furnace over the entire temperature range. That is, in the sintering step of Comparative Example 2, a mixed gas of Ar and CO was not introduced into the sintering furnace. A permanent magnet of Comparative Example 2 was produced by a method similar to Example 1, except for the sintering step. The permanent magnet of Comparative Example 2 was analyzed by a method similar to Example 1.

The permanent magnet of Comparative Example 2 contained a plurality of main phase grains and grain boundaries positioned between the main phase grains. The main phase grains included at least Nd, Fe, and B. A portion of the grain boundaries contained an R'—O—C phase. S1, S2, tc, and HcJ of Comparative Example 2 are presented in Table 1.

Comparative Example 3

Before the molding step, a powder of iron oxide ($Fe_2O_3$) and a powder of carbon black were added to the fine powder. From a mixture of the fine powder, iron oxide, and carbon black, a green compact of Comparative Example 3 was produced. The mass of iron oxide was 0.66 parts by mass with respect to 100 parts by mass of the fine powder. The mass of carbon black was 0.02 parts by mass with respect to 100 parts by mass of the fine powder. In the sintering step of Comparative Example 3, Ar gas was continuously introduced into the sintering furnace over the entire temperature range. That is, in the sintering step of Comparative Example 3, a mixed gas of Ar and CO was not introduced into the sintering furnace. A permanent magnet of Comparative Example 3 was produced by a method similar to Example 1, except for these matters. The permanent magnet of Comparative Example 3 was analyzed by a method similar to Example 1.

The permanent magnet of Comparative Example 3 contained a plurality of main phase grains and grain boundaries positioned between the main phase grains. The respective main phase grains included at least Nd, Fe, and B. A portion of the grain boundaries contained an R'—O—C phase. S1, S2, tc, and HcJ of Comparative Example 3 are presented in Table 1.

TABLE 1

|  | S1 (%) | S2 (%) | tc (hours) | HcJ (kA/m) |
|---|---|---|---|---|
| Example 1 | 41.5 | 3.3 | 500 | 1205 |
| Example 2 | 26.4 | 3.3 | 500 | 1202 |
| Example 3 | 12.7 | 3.3 | 500 | 1208 |
| Example 4 | 5.9 | 3.3 | 500 | 1206 |
| Example 5 | 4.3 | 3.3 | 400 | 1204 |
| Comparative Example 1 | 3.4 | 3.3 | 140 | 1210 |
| Comparative Example 2 | 2.7 | 2.7 | 100 | 1214 |
| Comparative Example 3 | 6.1 | 6.1 | 500 | 1043 |

INDUSTRIAL APPLICABILITY

For example, the R-T-B based permanent magnet according to the present invention is applied to a motor that is mounted in a hybrid car or an electric car.

REFERENCE SIGNS LIST

2: R-T-B based permanent magnet, 2cs: cross-section of R-T-B based permanent magnet, 4: main phase grain, 3: R'—O—C phase, 6: grain boundary multiple junction, 10: two-grain boundary, 21: surface layer portion, 22: central portion, I1: portion of cross-section of surface layer portion, 112: portion of cross-section of central portion.

What is claimed is:

1. An R-T-B based permanent magnet including a rare earth element R, a transition metal element T, and B,
   wherein the R-T-B based permanent magnet includes at least Nd as R,
   the R-T-B based permanent magnet includes at least Fe as T,
   the R-T-B based permanent magnet contains a plurality of main phase grains; and grain boundaries positioned between the main phase grains,
   the main phase grains include Nd, T, and B,
   at least a portion of the grain boundaries contains an R'—O—C phase,
   the R'—O—C phase includes a rare earth element R', O, and C,
   R' is at least one selected from the group consisting of Nd, Pr, Tb, and Dy,
   the unit of the concentration of each of R', O, and C is atom %,
   the concentration of each of R', O, and C in the R'—O—C phase is higher compared to the main phase grains,
   the R-T-B based permanent magnet comprises a surface layer portion and a central portion,
   the surface layer portion is positioned on the surface side of the R-T-B based permanent magnet,
   the central portion is positioned on the inner side of the R-T-B based permanent magnet,
   the proportion of the area of the R'—O—C phase occupying in a cross-section of the surface layer portion is S1%,
   the proportion of the area of the R'—O—C phase occupying in a cross-section of the central portion is S2%,
   S1 is higher than S2,
   a concentration of R' in the R'—O—C phase is from 30 atom % to 55 atom %,
   a concentration of O in the R'—O—C phase is from 10 atom % to 50 atom %,
   a concentration of C in the R'—O—C phase is from 5 atom % to 30 atom %, and
   S1 is from 4.3 to 80.

2. The R-T-B based permanent magnet according to claim 1, wherein S1-S2 is from 1.0 to 80.

3. The R-T-B based permanent magnet according to claim 1, wherein at least a portion of the R'—O—C phase further includes N.

4. The R-T-B based permanent magnet according to claim 1, wherein S2 is 0 or more and less than 4.3.

5. The R-T-B based permanent magnet according to claim 1, wherein
   a concentration of R' in the R'—O—C phase is represented by [R'] atom %,
   a concentration of 0 in the R'—O—C phase is represented by [O] atom %, and
   [O]/[R'] is more than 0.4 and less than 0.7.

6. The R-T-B based permanent magnet according to claim 3, wherein
   a concentration of R' in the R'—O—C phase is represented by [R'] atom %,
   a concentration of N in the R'—O—C phase is represented by [N] atom %, and
   [N]/[R'] is more than 0 and less than 1.0.

* * * * *